Figure 3:
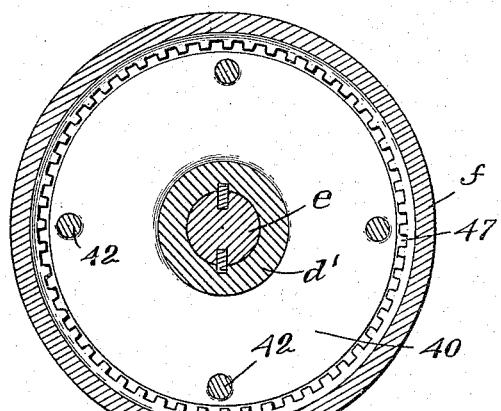

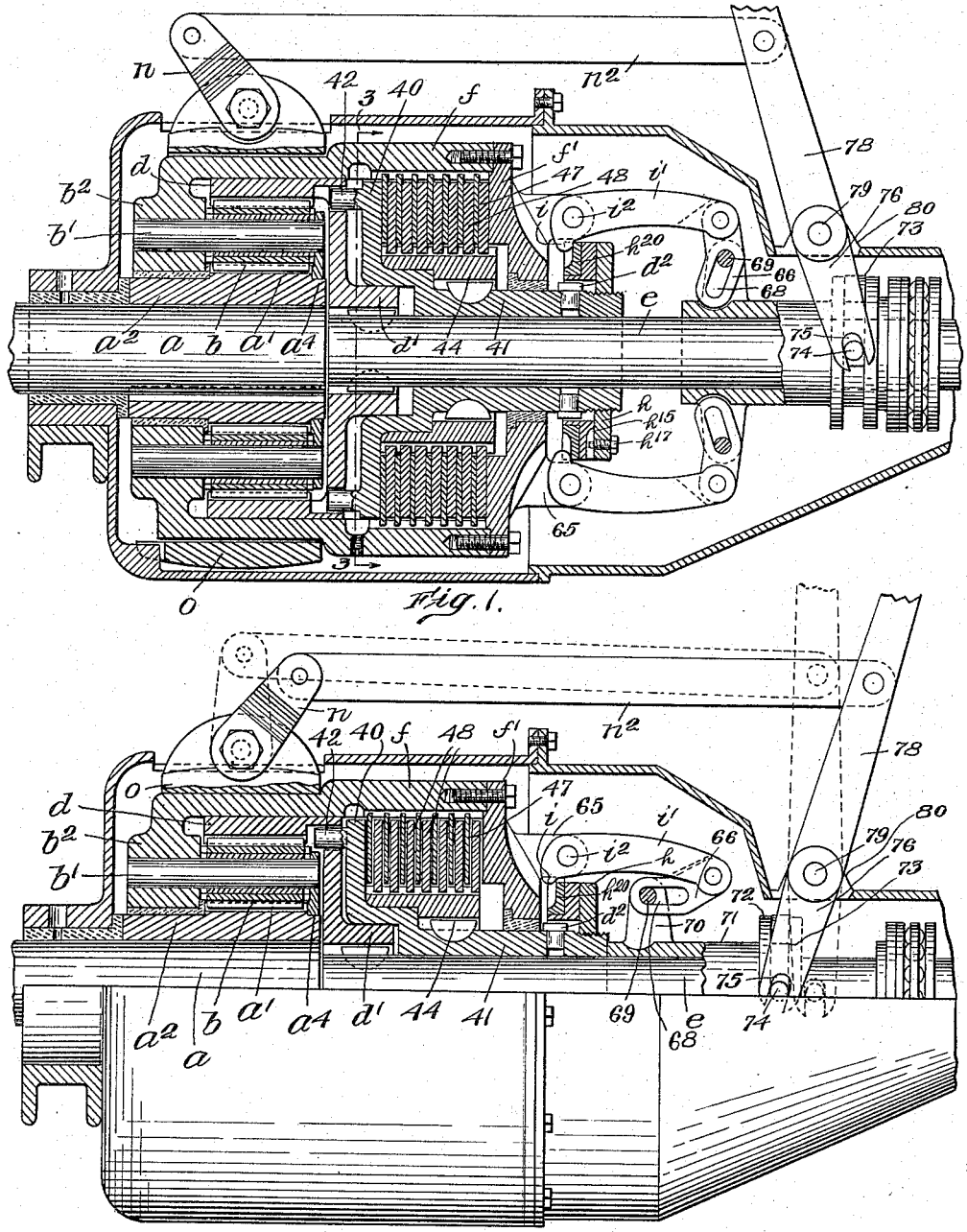

H. A. TUTTLE.
REVERSING GEARING.
APPLICATION FILED FEB. 19, 1912.

1,168,764.

Patented Jan. 18, 1916.
2 SHEETS—SHEET 2.

Witnesses:
H. B. Davis.
Cynthia Doyle.

Inventor:
Henry A. Tuttle,
by Pnyes o Harrinian
Attys.

UNITED STATES PATENT OFFICE.

HENRY A. TUTTLE, OF TAUNTON, MASSACHUSETTS, ASSIGNOR TO EVANS STAMPING & PLATING COMPANY, OF TAUNTON, MASSACHUSETTS, A CORPORATION OF MASSACHUSETTS.

REVERSING-GEARING.

1,168,764.      Specification of Letters Patent.      Patented Jan. 18, 1916.

Application filed February 19, 1912. Serial No. 678,569.

*To all whom it may concern:*

Be it known that I, HENRY A. TUTTLE, a citizen of the United States, residing at Taunton, in the county of Bristol and State of Massachusetts, have invented an Improvement in Reversing-Gearing, of which the following is a specification.

This invention relates to reversing-gearing to connect a continuously rotating shaft with another shaft, as for instance, an engine-shaft with a propeller-shaft, whereby the latter may be driven forward or backward or may remain idle, and is intended as an improvement upon the reversing-gearing shown in Letters Patent #901,664, dated October 20, 1908, and in my application for Letters Patent #629,596, filed May 26, 1911. In said patent clutch-mechanism is employed to connect the inclosing-case bearing the pinions, and usually termed the pinion-carrier, with the internal gear which is secured to the driven-shaft, thereby connecting said case with the driving-shaft, in order that the driven-shaft may be turned forward, and said clutch-mechanism is arranged outside of said case and is exposed and is also objectionable for the reason that it is not as powerful as is required for reversing-gearing of large dimensions; and in said application a more powerful form of clutch-mechanism is employed comprising a plurality of axially movable friction clutch-plates which are arranged within the case, but this latter construction, however, necessitates the case or pinion-carrier being moved axially when operating the clutch, which is objectionable.

The present invention has for its object to provide a powerful form of clutch-mechanism comprising a plurality of axially movable friction clutch-plates and to inclose the same within the case, and to provide an independent axially movable element to move said clutch-plates axially in one direction for engagement, and to permit movement thereof in the opposite direction for disengagement, said element being arranged for connection with the driven-shaft, either by connecting it with the internal gear which is secured to the driven-shaft or by connecting it directly with the driven-shaft, both forms of connection being here shown, although the connection with the internal gear is preferred. The means herein provided for moving the clutch-operating element axially is similar to that shown in my aforesaid application, but is constructed and arranged to move said element in both directions positively, thereby to cause said element when moved in one direction to move the clutch-plates into engagement and when moved in the opposite direction to insure entirely relieving the pressure or thrust upon said plates and permitting of their disengagement to such extent as to prevent any dragging action.

Figure 4:
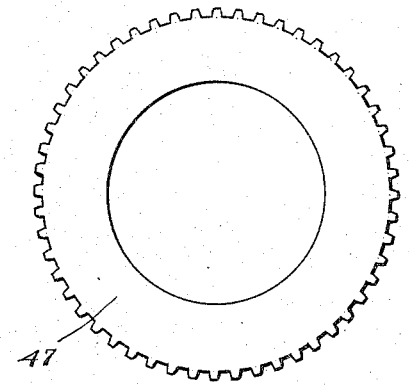
Figure 5:
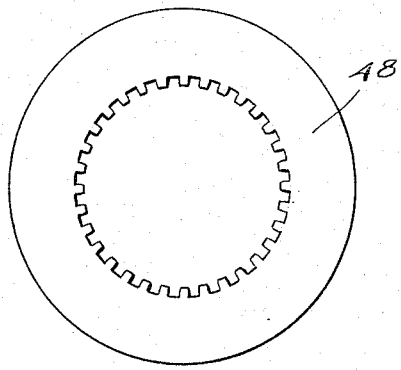
Figure 6:
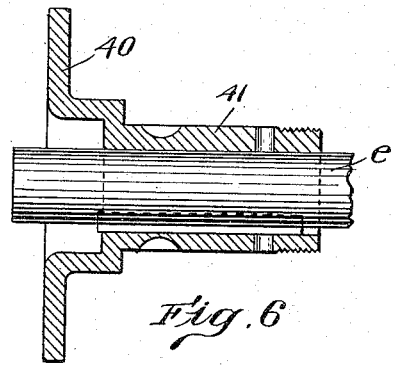

Figure 1 is a longitudinal vertical section of a reversing-gearing embodying this invention, the clutch being in engaging position. Fig. 2 is a longitudinal vertical section and partial elevation of the same, the clutch being disengaged. Fig. 3 is a transverse vertical section taken on the dotted line 3—3 Fig. 1. Figs. 4 and 5 represent the friction clutch-plates which may be employed. Fig. 6 is a longitudinal vertical section of the axially movable clutch-operating element arranged for direct connection with the driven-shaft.

As here shown, the driving-shaft $a$, spur-gear $a'$ secured to it having at one side an elongated hub $a^2$ and at the other side a short hub $a^4$, said shaft terminating approximately flush with the end of said short hub $a^4$, the several pinions $b$ arranged about said spur-gear and in engagement therewith, and the studs $b'$ with bushings thereon on which said pinions freely rotate, are all substantially as shown in said patent. The studs $b'$ are fixed to the end wall $b^2$ of the inclosing-case, of which $f$ represents the cylindrical body, and $f'$ the opposite end wall. The pinions $b$ also engage the teeth of an internal gear $d$, having a hub $d'$ which is secured to the driven-shaft $e$, said internal gear being arranged within the cylindrical body $f$ of the case or pinion-carrier. The driven-shaft $e$ is made quite long, and is ordinarily employed as the propeller-shaft, and its inner end terminates adjacent the end of the driving or engine-shaft $a$. The internal gear is designed to be rotated by the pinions, thereby to rotate the driven-shaft $e$ forward and backward, or said internal gear may remain idle and the driven-shaft $e$ consequently remain idle.

When the pinions are rotated about their axes in directions opposite to the direction of rotation of the spur-gear said internal gear will be driven backward or in a direction opposite to the direction of rotation of the driving-shaft; when said pinions are revolved about the axis of the driving-shaft with and by the spur-gear and in the same direction as that in which the spur-gear is rotated, said internal gear will be driven forward or in the same direction as that in which the driving-shaft is rotated; when said pinions are rotated about their axes and also revolved about the axis of the driven-shaft said internal gear remains idle.

The internal gear loosely fits the cylindrical body $f$ of the pinion-carrier or case, and both said gear and pinion carrier are free to rotate independently of each other, but when it is desired to drive the driven-shaft forward in the same direction as that in which the driving-shaft is rotating, the pinion-carrier or case is connected with one of the shafts, so that its pinions will be revolved about the axis of the driving-shaft with and by the spur-gear, and as here shown, said pinion-carrier or case is designed to be connected with the driven-shaft.

In Figs. 1 to 3 the pinion-carrier is represented as adapted to be connected with the internal gear which is secured to the driven-shaft, but in Fig. 6 means are represented for connecting the pinion-carrier directly with the driven-shaft.

Referring to Figs. 1 to 3, clutch-mechanism is provided for connecting said pinion-carrier or case with the internal gear, which latter is connected with the driven-shaft, said clutch-mechanism being very powerful and also being entirely concealed. Clutch-mechanism somewhat similarly constructed is shown in my application aforesaid, but in that instance the pinion-carrier or case is movable axially to operate the members of the clutch. In the present instance axial movement of the pinion-carrier or case is avoided and other operating means provided for the clutch-mechanism; whereby the operation of the clutch-members is much more positive, said operating-means being moved positively in both directions for engagement of the clutch-members and to permit of their disengagement. The cylindrical body $f$ of the case is extended a considerable distance beyond the end or crown of the internal gear to form a large space between said gear and the wall $f'$ of the case, and in said space the clutch-mechanism is arranged. The clutch-members consist of a plurality of friction clutch-plates 47, 48, arranged alternately with respect to each other, and said plates are arranged between the end wall $f'$ of the case and an axially movable plate 40. The end wall $f'$ is held against axial movement, but the plate 40 is movable axially to in turn move the clutch-plates axially for engagement. The plate 40 is made circular, and has a hub 41 which embraces the driven-shaft $e$, and said hub is made quite long and extends through a center hole in the end wall $f'$, so that one end of the pinion-carrier or case is supported upon it, a suitable bushing being interposed if desired. One side of the plate 40 is formed with a friction face for engagement with the endmost clutch-plate, and the other side is formed to provide for sliding engagement with the crown of the internal gear, and, as here shown, several lugs 42 are formed on it which enter holes formed in the crown of the internal gear. As the plate 40 is moved axially its lugs will be moved longitudinally in said holes, as indicated in Figs. 1 and 2, but engagement with the internal gear will be continuous. Some of the clutch-plates are arranged to slidably engage the interior of the pinion-carrier or case, and others to slidably engage the exterior of a collar 44, arranged on and secured to the hub 41, of the axially movable clutch-operating member, and, herein, the clutch-plates 48, are made as rings, see Fig. 5, with teeth on their inner edges which engage teeth formed on the collar 44, and the clutch-plates 47 are made as rings, see Fig. 4, with teeth on their outer edges which engage teeth formed on the interior of the cylindrical body $f$ of the pinion-carrier or case, thus slidably connecting the clutch-plates respectively with the collar and pinion carrier or case. As the collar is secured to the hub of the axially movable clutch-operating member 40, and as said member is continuously in engagement with the internal gear, and as said internal gear is secured to the driven-shaft it will be noted that the clutch-plates 48 are indirectly connected with the driven-shaft, whereas the clutch-plates 47 are connected with the pinion-carrier or case, so that when the clutch-plates are in engagement the pinion-carrier or case is connected with the internal gear, and hence with the driven-shaft.

Referring to Fig. 6, the axially movable clutch-operating member is represented as devoid of the lugs 42, but in lieu thereof its hub is arranged to receive a key by which it is secured directly to the driven-shaft but movable longitudinally with respect thereto and a direct connection thereby produced. To move the clutch-operating member 40 axially in both directions means are here shown constructed somewhat similar to the means shown in my aforesaid application, but having the additional function of moving the clutch-operating member in both directions, and, as here shown, the hub 41 of the clutch-operating member which extends through the center-hole in the end wall $f'$ is further extended for a considerable distance, see Figs. 1 and 2, and has arranged on it a threaded collar $h$, which is adjustable thereon, and an annular plate $h^{15}$, adjacent said collar which is recessed at several places to receive a screw $h^{17}$, which projects from the inner face of said collar, thus permitting adjustment of said plate. Said plate $h^{15}$ has key-ways to receive the square heads of pins $d^2$, and also is cut away on its side opposite the collar to receive a ring $h^{20}$, which is recessed at several places to receive projections $i$ on operating-levers $i'$ which levers are pivoted at $i^2$ to ears 65 formed on and extended outwardly from the end wall $f'$ of the pinion-carrier or case. To the outer bifurcated ends of said levers $i'$ obtuse angled links 66 are pivotally connected, said links having elongated slots 68, which receive pins 69 extended laterally from ears 70 projecting from the hub 71 of a thrust-collar 72, mounted loosely on the driven-shaft $e$, and adapted to be moved longitudinally thereon. Said thrust-collar receives a yoke 73 having pins 74 extended from it in opposite ways, which enter notches 75 formed in the extremities of arms 76 of the actuating-lever 78, fulcrumed at 79, in ears 80, formed on and projecting from an outer protecting shell which is provided for the gearing. Movement of the actuating-lever 78 in the one direction, as for instance, toward the left from vertical, see Fig. 1, operates to slide the thrust-collar along on the shaft $e$ in the opposite direction, thereby to move the links 66 and in turn move the levers $i$ and cause the projections on said levers to engage and move the ring $h^{20}$ and adjacent parts in a direction toward the right, thereby to correspondingly move the clutch-operating member 40 to move the clutch-plates axially into engagement with each other and with the end wall $f'$ of the pinion-carrier or case. Movement of said actuating-lever 78 back to vertical or neutral position, see dotted lines Fig. 2, operates to move the thrust-collar in a direction toward the left a short distance to move the links 66 into the full line position there shown, and thereby move the operating-levers to disengage the ring $h^{20}$ permitting a slight axial movement of the clutch-operating plate 40, sufficient to relieve the pressure upon the clutch-plates; movement of said actuating-lever to the right of its vertical or neutral position operates to move the thrust-collar farther in a direction toward the left, to cause the end of the hub of the thrust-collar to engage the end of the hub 41 of the clutch-operating member, thereby to move said member a short distance in a direction toward the left to positively insure disengagement of the clutch-plates and during such movement the pins 69 move along in the slots in the links 60 until they arrive at the ends of said slots, thus limiting the movement. Herein the brake-mechanism for the pinion-carrier or case has an operating-member $n$ which is connected by a link $n^2$ with the actuating-lever 78, and it is important to insure the disengagement of the clutch before the brake-mechanism is moved into engagement with the pinion-carrier or case. Sometimes when the actuating-member is moved from clutch-engaging position to neutral, the clutch plates drag or chafe, but by a quick throw of said member through neutral and into reversing position and then back to neutral, the clutch operating-member will be engaged by the end of the thrust-collar, and will be positively moved to allow for the normal separation of the clutch-plates.

The several structural features here shown which are disclosed in my aforesaid application are not herein claimed.

I claim:—

1. In a reversing-gearing, a driving-shaft, a driven-shaft, gearing connecting said shafts comprising brake-mechanism to secure reverse drive, and clutch-mechanism to secure forward drive, including a non-axially movable inclosing-case which is associated with both mechanism, said clutch-mechanism, including its operating-member, being arranged within the case, and its operating-member being rotatable with the driven-shaft but slidable with respect thereto, and extended outward through the end of the case and actuating-means for said operating-member and brake-mechanism.

2. In a reversing-gearing, a driving-shaft, a driven-shaft, gearing connecting said shafts comprising brake-mechanism to secure reverse drive, and clutch-mechanism to secure forward drive, including a non-axially movable inclosing-case which is associated with both mechanisms, said clutch-mechanism, including its operating-member, being arranged within the case, and its operating-member being rotatable with the driven-shaft but slidable with respect thereto, and extended outward through the end of the case, and having an abutment and actuating-means for said operating-member and brake-mechanism and coöperating with said abutment.

3. In a reversing-gearing, a driving-shaft, a driven-shaft, gearing connecting said shafts comprising brake-mechanism to secure reverse drive, and clutch-mechanism to secure forward drive, including a non-axially movable inclosing-case which is associated with both mechanisms, said clutch-mechanism, including its operating-member, being arranged within the case, and its operating-member being rotatable with the driven-shaft but slidable with respect thereto, and extended outward through the end of the case, and actuating-means for the operating-member and brake-member.

4. In a reversing-gearing, a driving-shaft, a driven-shaft, gearing connecting said shafts comprising brake-mechanism to secure reverse drive, and clutch-mechanism to secure forward drive, including an inclosing-case which is associated with both mechanisms, said clutch-mechanism comprising clutch-members and an operating-member arranged within the case, its operating-member being arranged for rotation with, but movable with respect to the driven-shaft, and extended outward through the end of the case and actuating-means for said operating-member and brake-mechanism.

5. In a reversing-gearing, a driving-shaft, a driven-shaft, gearing connecting said shafts comprising brake-mechanism to secure reverse drive, and clutch-mechanism to secure forward drive, including an inclosing-case which is associated with both mechanisms, said clutch-mechanism comprising clutch-members and an operating-member arranged within the case, its operating-member being arranged for rotation with, but movable with respect to the driven-shaft, and extended outward through the end of the case, and actuating-means for said operating-member which is arranged to operate the brake-member.

6. In a reversing-gearing, a driving-shaft, a driven-shaft, gearing connecting said shafts comprising brake-mechanism for reverse drive, and clutch-mechanism for forward drive, including an inclosing-case which is associated with both mechanisms, said clutch-mechanism comprising clutch-members arranged within said case, and axially movable clutch-operating-means arranged for rotation with the driven-shaft, but slidable with respect thereto, said clutch-operating-means comprising a clutch-engaging-portion arranged at the inside of the clutch-members and an abutment connected therewith and arranged at the outside of the inclosing-case, and means arranged to move said clutch-operating-means axially which is connected with and arranged to operate the brake-member.

7. In a reversing-gearing, a driving-shaft, a driven-shaft, gearing connecting said shafts comprising a brake-mechanism for reverse drive, and clutch-mechanism for forward drive, including an inclosing-case associated with both mechanisms, said clutch-mechanism having an axially movable clutch-operating-member arranged for rotation with the driven-shaft, but slidable with respect thereto, comprising a clutch-engaging-portion arranged at the inside of the clutch-mechanism, and an abutment arranged at the outside of the inclosing-case, and means arranged to engage said abutment and move it axially, and thereby correspondingly move the clutch engaging-member, said means being connected with the brake-mechanism.

8. In a reversing-gearing, a driving-shaft, a driven-shaft, gearing connecting said shafts comprising brake-mechanism for reverse drive, and clutch-mechanism for forward drive, including a non-axially movable inclosing-case associated with both mechanisms, said clutch-mechanism, including its operating-member, being arranged within the case, and its operating-member being rotatable with the driven-shaft but slidable with respect thereto, and extended outward through the end of the case, and having an abutment arranged at the outside of the inclosing-case, levers pivotally supported on the outside of said case having projections arranged for engagement with said abutment, and means to move said levers on their pivots, thereby to move axially the abutment and clutch operating-member, said means being connected with the brake-member.

9. In a reversing-gearing, a driving-shaft, a driven-shaft, gearing connecting said shafts comprising brake-mechanism to secure reverse drive, and clutch-mechanism to secure forward drive, including a non-axially movable inclosing-case which is associated with both mechanisms, said clutch-mechanism, including its operating-member, being arranged within the case, and its operating-member being rotatable with the driven-shaft but slidable with respect thereto, and extended outward through the end of the case, pivoted levers supported upon the inclosing-case for moving said clutch operating-member, and means connected with said levers and also with the brake-member arranged to actuate them both.

10. In a reversing-gearing, a driving-shaft, a driven-shaft, gearing connecting said shafts comprising a brake-mechanism to secure reverse drive, and clutch-mechanism to secure forward drive, and including an inclosing-case associated with both mechanisms and also an internal-gear secured to the driven-shaft, said clutch-mechanism, including its operating-member, being arranged within the case, and its operating-member being slidably connected with said internal-gear to rotate therewith and extended outward through the end of the case and actuating-means for said operating-member and brake-mechanism.

11. In a reversing-gearing, a driving-shaft, a driven-shaft, gearing connecting said shafts comprising a brake-mechanism to secure reverse drive, and clutch-mechanism to secure forward drive, and including an inclosing-case associated with both mechanisms and also an internal-gear secured to the driven-shaft, said clutch-mechanism, including its operating-member, being arranged between the end wall of the case and the internal-gear and its operating-member being extended outward through the end wall of the case and actuating-means for said operating-member and brake-mechanism.

12. In a reversing-gearing, a driving-shaft, a driven-shaft, gearing connecting said shafts comprising a brake-mechanism to secure reverse drive, and clutch-mechanism to secure forward drive, including an inclosing-case associated with both mechanisms and an internal-gear, said case being extended beyond the internal-gear to provide a wide space between them, said clutch-mechanism and its operating-member being arranged in said space, and its operating-member being connected for rotation with but slidable with respect to the driven-shaft, and extended outward through the end of the case and actuating-means for said operating-member and brake-mechanism.

13. In a reversing-gearing, a driving-shaft, a driven-shaft, gearing connecting said shafts, comprising a brake-mechanism to secure reverse drive, a clutch-mechanism to secure forward drive, including a toothed-element, made as a case, and arranged for association with both mechanisms and also to inclose them, and external actuating-means for both mechanisms, which are connected together and provided with a single operating-lever.

14. In a reversing-gearing, a driving-shaft, a driven-shaft, gearing connecting said shafts comprising brake-mechanism to secure reverse drive, and clutch-mechanism to secure forward drive, including a toothed element, made as a case, and arranged for association with both mechanisms, and also to inclose them, the clutch-operating-member of said clutch-mechanism being slidably connected with the driven-shaft, and external actuating-means for both mechanisms, which are connected together, and provided with a single operating-lever.

15. In a reversing-gearing, a driving-shaft, a driven-shaft, gearing connecting said shafts comprising brake-mechanism to secure reverse drive, and clutch-mechanism to secure forward drive, including a toothed element, made as a case, and arranged for association with both mechanisms, and also to inclose them, said clutch-mechanism, including clutch-plates, slidably engaging said toothed element, and a clutch-operating-member having means for slidably supporting clutch-plates alternately disposed with respect to the aforesaid clutch-plates, said operating-member being extended through the end of the case and actuating-means for said operating-member and brake-mechanism.

16. In a reversing-gearing, a driving-shaft, a driven-shaft, gearing connecting said shafts comprising a brake-mechanism to secure reverse drive, and a clutch-mechanism to secure forward drive, including a non-axially movable toothed element, made as a case, and arranged for association with both mechanisms, and also to inclose them, said clutch-mechanisms including clutch-plates slidably engaging said toothed element, and a clutch-operating member having means for slidably supporting clutch-plates, alternately disposed with respect to the aforesaid clutch-plates, said operating-member being arranged for rotation with, but slidable with respect to the driven-shaft, and extended outward through the end wall of the case and actuating-means for said operating-member and brake-mechanism.

17. In a reversing-gearing, a driving-shaft, a driven-shaft, gearing connecting said shafts comprising a brake-mechanism to secure reverse drive, and a clutch-mechanism to secure forward drive, including a non-axially movable toothed element, made as a case, and arranged for association with both mechanisms, and also to inclose them, said clutch-mechanisms including clutch-plates slidably engaging said toothed element, and a clutch-operating member having means for slidably supporting clutch-plates, alternately disposed with respect to the aforesaid clutch-plates, said operating-member being slidably connected with an element of the brake-mechanism which is connected with the driven-shaft, and being extended outward through the end of the case and actuating-means for said operating-member and brake-mechanism.

18. In a reversing-gearing, a driving-shaft, a driven-shaft, gearing connecting said shafts, comprising brake-mechanism to secure reverse drive, and clutch-mechanism to secure forward drive, including an element made as an inclosing-case for both mechanisms, and bearing pinions and having a toothed-portion forming a component part of the clutch-mechanism, said clutch-mechanism including clutch-plates, slidably engaging said toothed element, and a clutch-operating member having means for slidably supporting clutch-plates, alternately disposed with respect to the aforesaid clutch-plates, said operating-member being extended through the end of the case and actuating-means for said operating-member and brake-mechanism.

19. In a reversing-gearing, a driving-shaft, a driven-shaft, gearing connecting said shafts, comprising brake-mechanism to secure reverse drive, and clutch-mechanism to secure forward drive, including a non-axially movable element made as an inclosing-case for both mechanisms, and bearing pinions and having a toothed-portion forming a component part of the clutch-mechanism, said clutch-mechanism including clutch-plates, slidably engaging said toothed element, and a clutch-operating member having means for slidably supporting clutch-plates, alternately disposed with respect to aforesaid clutch-plates, said operating-member being slidably connected with an element of the brake-mechanism which is connected with the driven-shaft, and being extended outward through the end of the case and actuating-means for said operating-member and brake-mechanism.

20. In a reversing-gearing, a driving-shaft, a driven-shaft, gearing connecting said shafts, comprising a brake-mechanism to secure reverse drive, including an internal-gear secured to the driven-shaft, and clutch-mechanism to secure forward drive, including a non-axially movable element, made as an inclosing-case for both mechanisms, and bearing pinions and having a toothed-portion forming a component part of the clutch-mechanism, said clutch-mechanism including clutch-plates slidably engaging said toothed element, and a clutch-operating member having means for slidably supporting clutch-plates, alternately disposed with respect to the aforesaid clutch-plates, said operating-member being arranged for rotation with, but slidable with respect to, the internal gear.

21. In a reversing-gearing, a driving-shaft, a driven-shaft, gearing connecting said shafts comprising brake-mechanism to secure reverse drive, and clutch-mechanism to secure forward drive, an axially movable clutch operating-member, actuating-means for said clutch operating-member and brake-mechanism, arranged for movement in opposite directions from normal, in one direction to move the clutch operating-member into clutch-engaging position, and in the other direction to actuate the brake-mechanism and also restore the clutch operating-member to disengaged position.

22. In a reversing-gearing, a driving-shaft, a driven-shaft, gearing connecting said shafts comprising a brake-mechanism to secure reverse drive and clutch-mechanism to secure forward drive, said clutch-mechanism comprising axially movable clutch-plates and an axially movable operating-member, actuating-means for said clutch operating-member and brake-mechanism arranged for movement in opposite directions from normal, in one direction to move the clutch operating-member into clutch-engaging position, and in the other direction to actuate the brake-mechanism, a component part of said actuating-means being arranged to positively return the clutch operating-member to normal position when said actuating-means is moved into reversing position.

23. In a reversing-gearing, a driving-shaft, a driven-shaft, gearing connecting said shafts and comprising brake-mechanism to secure reverse drive, and clutch-mechanism to secure forward drive, including an inclosing case associated with both mechanisms, said clutch-mechanism including its operating-member being arranged within the case, and its operating-member being rotatable with the driven-shaft, but slidable with respect thereto, and extended outward through the end of the case for engagement with its actuating-means, actuating-means for said member including a thrust-collar arranged on the driven-shaft and adapted when moved in one direction to move axially the clutch operating-member to operate the clutch-mechanism, and when moved in the opposite direction to engage and move said clutch operating-member, at the end of its stroke, to insure disengagement of the clutch-members.

In testimony whereof, I have signed my name to this specification, in the presence of two subscribing witnesses.

HENRY A. TUTTLE.

Witnesses:
H. B. DAVIS,
B. J. NOYES.

Copies of this patent may be obtained for five cents each, by addressing the "Commissioner of Patents, Washington, D. C."